US007569275B2

(12) United States Patent
Fukushi et al.

(10) Patent No.: US 7,569,275 B2
(45) Date of Patent: *Aug. 4, 2009

(54) FLUOROPOLYMER ARTICLES

(75) Inventors: Tatsuo Fukushi, Woodbury, MN (US);
Naiyong Jing, Woodbury, MN (US);
Attila Molnar, Vadnais Heights, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 592 days.

This patent is subject to a terminal disclaimer.

(21) Appl. No.: 10/126,126

(22) Filed: Apr. 18, 2002

(65) Prior Publication Data

US 2003/0198771 A1  Oct. 23, 2003

(51) Int. Cl.
*B32B 27/00* (2006.01)
(52) U.S. Cl. .................. 428/421; 428/35.7; 428/36.91; 428/422; 138/141
(58) Field of Classification Search .............. 428/36.91, 428/421, 422, 35.7; 138/137, 141
See application file for complete search history.

(56) References Cited

U.S. PATENT DOCUMENTS

| | | |
|---|---|---|
| 2,789,063 A | 4/1957 | Purvis et al. |
| 3,418,302 A | 12/1968 | Darby |
| 3,484,503 A | 12/1969 | Magner et al. |
| 3,987,126 A | 10/1976 | Brodoway |
| 4,148,982 A | 4/1979 | Morozumi et al. |
| 4,214,060 A | 7/1980 | Apotheker et al. |
| 4,260,698 A | 4/1981 | Tatemoto et al. |
| 4,287,322 A | 9/1981 | Worm |
| 4,338,237 A | 7/1982 | Sulzbach et al. |
| 4,391,870 A | 7/1983 | Ellis |
| 4,413,094 A | 11/1983 | Aufdermarsh, Jr. |
| 4,463,144 A | 7/1984 | Kojima et al. |
| 4,530,970 A | 7/1985 | Morozumi et al. |
| 4,552,925 A | 11/1985 | Nakagawa et al. |
| 4,555,543 A | 11/1985 | Effenberger et al. |
| 4,560,737 A | 12/1985 | Yamamoto et al. |
| 4,600,651 A | 7/1986 | Aufdermarsh et al. |
| 4,647,413 A | 3/1987 | Savu |
| 4,659,625 A | 4/1987 | Decroly et al. |
| 4,713,418 A | 12/1987 | Logothetis et al. |
| 4,745,165 A | 5/1988 | Arcella et al. |
| 4,749,752 A | 6/1988 | Youlu et al. |
| 4,886,689 A | 12/1989 | Kotliar et al. |
| 4,897,457 A | 1/1990 | Nakamura et al. |
| 4,910,276 A | 3/1990 | Nakamura et al. |
| 4,935,467 A | 6/1990 | Cheng et al. |
| 5,006,594 A | 4/1991 | Rees |
| 5,051,479 A | 9/1991 | Logothetis et al. |
| 5,057,345 A | 10/1991 | Barrett |
| 5,109,071 A | 4/1992 | Johnson et al. |
| 5,141,800 A | 8/1992 | Effenberger et al. |
| 5,170,011 A | 12/1992 | Martucci |
| 5,192,476 A | 3/1993 | Green |
| 5,194,335 A | 3/1993 | Effenberger et al. |
| 5,240,775 A | 8/1993 | Tannenbaum |
| 5,252,401 A | 10/1993 | Kitto et al. |
| 5,285,002 A | 2/1994 | Grootaert |
| 5,320,888 A | 6/1994 | Stevens |
| 5,354,811 A | 10/1994 | Kamiya et al. |
| 5,383,087 A | 1/1995 | Noone et al. |
| 5,427,831 A | 6/1995 | Stevens |
| 5,476,080 A | 12/1995 | Brunnhofer |
| 5,512,225 A | 4/1996 | Fukushi |
| 5,527,858 A | 6/1996 | Blong et al. |
| 5,552,199 A | 9/1996 | Blong et al. |
| 5,554,425 A | 9/1996 | Krause et al. |
| 5,566,570 A | 10/1996 | Hankel et al. |
| 5,566,720 A | 10/1996 | Cheney et al. |
| 5,573,039 A | 11/1996 | Mang |
| 5,613,524 A | 3/1997 | Martucci |
| 5,626,930 A | 5/1997 | Fukushi |
| RE35,527 E | 6/1997 | Martucci |
| 5,653,266 A | 8/1997 | Reynolds et al. |
| 5,655,572 A | 8/1997 | Marena |
| 5,656,121 A | 8/1997 | Fukushi |
| 5,658,670 A | 8/1997 | Fukushi et al. |
| 5,658,671 A | 8/1997 | Fukushi |
| 5,733,981 A | 3/1998 | Coggio et al. |

(Continued)

FOREIGN PATENT DOCUMENTS

EP  0 132 583  2/1985

(Continued)

OTHER PUBLICATIONS

*Macromolecules*, 2001, 34, "Miscibility Study in Fluorinated Tetrafluoroethylene Copolymer-Copolymer Blends", Pucciariello & Villain, pp. 1764-1771.
*Macromolecules*, 2000, 36, "Melt-Processable Poly(tetrafluoroethylene)", Tervoort, Visjager, Graff & Smith, pp. 6460-6465.
*Fluoroplastics: Non-Melt Processible Fluoroplastics: The Definitive User's Guide and Databook*, "Fluoropolymers: Properties and Structure", Feb. 2000, pp. 23-32.
*Journal of Polymer Science: Part B: Polymer Physics*, vol. 37, 1999 John Wiley & Sons, Inc., "Phase Behavior of Crystalline Blends of Poly(tetrafluoroethylene) and of Random Fluorinated Copolymers of Tetrafluoroethylene", pp. 679-689.
*Modern Fluoropolymer*, John Wiley and Sons, Chapter 7, "Adhesion Properties of Fluoropolymers", D.M. Brewis and I. Mathieson, pp. 165-172 (1997).

(Continued)

Primary Examiner—Michael C Miggins
(74) Attorney, Agent, or Firm—Dena M. Ehrich

(57) ABSTRACT

The invention provides an article comprising a first layer comprising a first substantially solid partially-fluorinated thermoplastic polymer, and a second layer comprising a second substantially solid partially-fluorinated thermoplastic polymer, the second layer bonded to the first layer, wherein the first polymer and the second polymer have different compositions. The invention also provides layered articles and processes for preparing layered articles.

25 Claims, No Drawings

U.S. PATENT DOCUMENTS

| | | | |
|---|---|---|---|
| 5,741,855 A | 4/1998 | Kaduk et al. | |
| 5,827,587 A | 10/1998 | Fukushi | |
| 5,855,977 A | 1/1999 | Fukushi et al. | |
| 5,908,704 A | 6/1999 | Friedman et al. | |
| 5,916,659 A | 6/1999 | Koerber et al. | |
| 5,931,201 A | 8/1999 | Hsich | |
| 5,934,336 A | 8/1999 | Hsich | |
| 5,960,977 A | 10/1999 | Ostrander et al. | |
| 5,974,649 A | 11/1999 | Marena | |
| 6,012,496 A | 1/2000 | Hsich et al. | |
| 6,039,084 A | 3/2000 | Martucci et al. | |
| 6,039,085 A | 3/2000 | Hsich | |
| 6,074,719 A | 6/2000 | Fukushi et al. | |
| 6,077,609 A | 6/2000 | Blong et al. | |
| 6,080,487 A | 6/2000 | Coggio et al. | |
| 6,117,508 A * | 9/2000 | Parsonage et al. | 428/36.91 |
| 6,155,304 A | 12/2000 | Hsich et al. | |
| 6,176,268 B1 | 1/2001 | Hsich et al. | |
| 6,192,942 B1 | 2/2001 | Hsich et al. | |
| 6,194,050 B1 | 2/2001 | Koerber et al. | |
| 6,197,393 B1 | 3/2001 | Jing et al. | |
| 6,203,873 B1 | 3/2001 | Shifman et al. | |
| 6,242,548 B1 | 6/2001 | Duchesne et al. | |
| 6,257,280 B1 | 7/2001 | Marena | |
| 6,263,920 B1 | 7/2001 | Hsich et al. | |
| 6,265,462 B1 | 7/2001 | Egitto et al. | |
| 6,270,901 B1 | 8/2001 | Parsonage et al. | |
| 6,310,141 B1 | 10/2001 | Chen et al. | |
| 6,346,328 B1 | 2/2002 | Parsonage et al. | |
| 6,361,641 B1 | 3/2002 | Blong et al. | |
| 6,372,870 B1 | 4/2002 | Kitahara et al. | |
| 6,716,497 B2 * | 4/2004 | Araki et al. | 428/34.7 |
| 6,790,912 B2 | 9/2004 | Blong | |
| 2001/0034414 A1 | 10/2001 | Effenberger et al. | |
| 2002/0003441 A1 | 1/2002 | Steensgaard-Madsen | |
| 2002/0036020 A1 | 3/2002 | Noone et al. | |
| 2002/0037985 A1 * | 3/2002 | Lyons et al. | 526/247 |
| 2003/0049399 A1 | 3/2003 | Noguchi et al. | |
| 2003/0198769 A1 * | 10/2003 | Jing et al. | 428/36.91 |
| 2003/0198770 A1 * | 10/2003 | Fukushi et al. | 428/36.91 |

FOREIGN PATENT DOCUMENTS

| | | |
|---|---|---|
| EP | 0 650 987 A1 | 5/1995 |
| EP | 0 957 148 A1 | 11/1999 |
| EP | 0 992 518 A1 | 4/2000 |
| EP | 1 039 199 A2 | 9/2000 |
| EP | 1 156 254 A1 | 11/2001 |
| EP | 1 217 279 A1 | 6/2002 |
| EP | 1 270 208 A1 | 1/2003 |
| EP | 1 270 209 A1 | 1/2003 |
| JP | 52-0866442 | 7/1977 |
| JP | S60-23701 | 6/1985 |
| JP | 61 021141 | 1/1986 |
| JP | 09/176425 | 7/1997 |
| WO | WO93/06159 | 4/1993 |
| WO | WO 96/21820 | 7/1996 |
| WO | WI 98/08679 | 3/1998 |
| WO | WO 99/61227 | 12/1999 |
| WO | WO 00/13891 | 3/2000 |
| WO | WO 01/81077 | 11/2001 |
| WO | WO 01/98405 | 12/2001 |
| WO | WO 02/00741 | 1/2002 |
| WO | WO 02/14065 | 2/2002 |
| WO | WO 02/14066 | 2/2002 |
| WO | WO 02/16111 | 2/2002 |
| WO | WO 02/16131 | 2/2002 |
| WO | WO 03/037621 A2 | 5/2003 |

OTHER PUBLICATIONS

*Journal Adhesion*, 41, "Adhesion Studies of Fluoropolymers", D.M. Brewis, I. Mathieson and I. Sutherland, pp. 113-128 (1993).
*Science*, 251, 898, F.S. Bates, 1991.
*SPI Fluoropolymer Fall Conference*, Oct. 1-3, 1995, "Fluoropolymer Cladding of Non-Fluoropolymeric Materials", John A. Effenberger-Chemfab.
Owens et al., "Estimation of the Surface Free Energy of Polymes", Journal of Applied Polymer Science, 1969, vol. 13, pp. 1741-1747.
Fukui, H., et al., "Thermal and Oxidative Stability of Fluorinated Alkyl Aryl Ethers," *Journal of Fluorine Chemistry* (2000), pp. 91-96, vol. 101, Elsevier Science S.A., NY, NY.

* cited by examiner

FLUOROPOLYMER ARTICLES

TECHNICAL FIELD

This invention relates to a fluoropolymer-fluoropolymer assembly useful in a layered sheet, a hose such as for conveying fuels or chemicals, and the like.

BACKGROUND

Fluoropolymers are used for their properties such as chemical resistance and low fuel permeation. Automotive applications, such as fuel hoses, demand lower and lower fuel permeation to minimize evaporative emissions and meet stronger environmental standards. These applications demand fluoropolymers. Thin layers of fluoropolymers often are used in combination with other materials, which provide resilience, strength, durability, and other desired properties in a composite. However, fluoropolymers are known to be difficult to bond. A variety of methods have been used to promote adhesion between fluoropolymers and non-fluoropolymers as well as between two fluoropolymers such as THV and FKM. These methods include treating the surface of one or both of the layers, using blends of two polymers such as a polyamide with a THV, mixing a polyamide and a grafted fluoropolymer having polar functionality, using tie layers, and using adhesives.

SUMMARY

Briefly, the present invention provides an article comprising a first layer comprising a first substantially solid partially-fluorinated thermoplastic polymer, and a second layer comprising a second substantially solid partially-fluorinated thermoplastic polymer, the second layer bonded to the first layer, wherein the first polymer and the second polymer have different compositions.

The invention also provides a process for preparing a layered article comprising providing a first layer comprising a partially-fluorinated polymer, providing a second layer comprising a partially-fluorinated polymer contacting a surface of the first layer, heating at least one layer to a temperature above its softening point or melting point for a time sufficient to bond the layers, and optionally pressing the first layer to the second layer, wherein a bonding interface between said first layer and said second layer consists essentially of a first material having the composition of said first layer and a second material having the composition of said second layer.

In another aspect, the present invention provides a process for preparing a layered article comprising extruding a first layer comprising a first layer comprising a partially-fluorinated thermoplastic polymer, extruding a second layer comprising a partially-fluorinated thermoplastic polymer on a surface of the first layer, wherein a bonding interface between said first layer and said second layer consists essentially of a first material having the composition of said first layer and a second material having the composition of said second layer, and wherein said first layer and said second layer are bonded while at least one layer is above its melting point or softening point.

In this document: "fluorinated thermoplastic" means having a distinct melting point, as distinguished from amorphous materials such as fluorinated elastomers that usually do not have such a melting point; "partially-fluorinated" means at least one-fourth of the hydrogen atoms bonded to carbon atoms are replaced with fluorine atoms; and "substantially solid" means less than 30% by volume of enclosed voids or gases such as would be prevalent in foamed constructions.

It is an advantage of the present invention to provide multilayer fluoropolymer articles having a two fluoropolymer layers that are known to be difficult to bond, such as sheets, tubing, hoses, and other shaped articles, without resorting to surface treating, adhesives, tie layers, polymer grafting, blending, and the like to reach sufficient bond strength.

Other features and advantages of the invention will be apparent from the following detailed description of the invention and the claims. The above summary of principles of the disclosure is not intended to describe each illustrated embodiment or every implementation of the present disclosure. The following details more particularly exemplify certain preferred embodiments utilizing the principles disclosed herein.

DETAILED DESCRIPTION

The invention provides multi-layer composite constructions comprising a layer of a fluoropolymer such as tetrafluoroethylene-ethylene (ETFE), tetrafluoroethylene-hexafluoropropylene-ethylene (HTE), or a copolymer derived from tetrafluoroethylene (TFE), hexafluoropropylene (HFP), and vinylidene fluoride (VDF), such as the THV series available from Dyneon LLC, Oakdale Minn., along with another layer of a fluorothermoplastic such as a THV having a lower melting point than the fluoropolymer used in the first layer. The interlayer adhesion between such lower-melting fluorothermoplastic and other fluorothermoplastic such as ETFE, HTE, or higher-melting THV is good to excellent. This construction advantageously can be bonded to a hydrocarbon polymer cover material to prepare a variety of useful articles including, for example, films, sheets, fuel hoses and filler necks, tubing, etc. Thus, the invention enables the construction of multilayer articles having a fluoropolymer layer that is known to be difficult to bond. In addition, the invention can be used in combination with any known adhesive layer, tie layer, or other bonding system.

In one aspect, the invention provides an article comprising a first layer comprising a first substantially solid partially-fluorinated thermoplastic polymer, and a second layer comprising a second substantially solid partially-fluorinated thermoplastic polymer, the second layer bonded to the first layer wherein the first polymer and the second polymer have different compositions.

The first and second layers in the article of the invention are substantially solid, containing less than 30% of the volume of a layer comprised of enclosed voids or gases such as occurs in foamed constructions. In other embodiments, less than 20%, less than 10%, or even 0% of the volume of a layer comprises enclosed voids or gases.

Any known partially-fluorinated thermoplastic polymers can be used in the invention. For example, these polymers include various combinations of interpolymerized units of TFE, HFP, VDF, perfluoro alkyl or alkoxy vinyl ethers (PAVE or PAOVE), and nonfluorinated olefins. Materials in this class include ETFE, HTE, polyvinylidene fluoride (PVDF), TFE/P, polyethylenechlorotrifluoroethylene (ECTFE) and copolymers of TFE/HFP/VDF known in the art as THV materials.

The partially-fluorinated polymer in the first and/or second layer may comprise interpolymerized units of Formula I: —CF(X)—CX$_2$—, wherein each X is independently hydrogen, a halogen atom, or a C$_1$-C$_8$ alkyl group which may be linear or branched and which may be fluorinated. These include homopolymers as well as copolymers which have two or more different interpolymerized units of Formula I.

In one embodiment, at least one fluoropolymer comprises at least 35 weight percent (wt %) of its interpolymerized units of Formula I. In another embodiment, at least one fluoropolymer comprises at least 70 wt % of its interpolymerized units of Formula I. In another embodiment, at least one fluoropolymer comprises at least 80 wt % of its interpolymerized units of Formula I. The fluoropolymer may further include interpolymerized units derived from other monomers in various combinations.

In one aspect, at least one layer comprises interpolymerized units of a hydrogen-containing monomer having a pH at or below the pH of vinylidene fluoride.

Partially fluorinated polymers of VDF, HFP and TFE are known to be readily dehydrofluorinated by bases in the presence of a phase transfer catalyst. This is thought to occur because the methylene groups of VDF are surrounded by fluorocarbons (resulting from an interpolymerized vinylidene fluoride monomer), which are known to be electron-withdrawing groups. As a result, the hydrogen of the methylene units become more acidic and are susceptible to base attack to undergo dehydrofluorination. The newly formed carbon-carbon double bonds enable bonding to organic and inorganic substrates having nucleophilic functionalities. Monomers useful in polymers of the invention which are similar to VDF in this respect include $CFH=CF_2$, $CH_2=CHF$, $CH_2=CHR_f$, perfluoroaryl vinyl ether, $CF_2=CHR_f$, wherein $R_f$ is a $C_1$-$C_{10}$ perfluoroalkyl group. Specific examples of suitable partially fluorinated monomers include vinyl fluoride and VDF.

In one aspect, the layer having a lower pH of the first and second layer may bond to hydrocarbon substrates and inorganic substrates with improved adhesion over the layer with a higher pH.

The partially fluorinated polymer also may comprise interpolymerized units of Formula II:

(II)

wherein each Y is independently a bond, Oxygen, or $CF_2$; each Z is independently F or $R_f$ wherein each $R_f$ is independently a $C_1$-$C_{10}$ fluoroalkyl group which may be linear or branched; and n is 0-3. In this embodiment, additional partially-fluorinated interpolymerized units are also present in the fluoropolymer of the invention.

The partially-fluorinated polymer also may comprise interpolymerized units of a perfluorinated vinyl ether of Formula III:

$CF_2=CFO(R_fO)_aR_f$ (III)

wherein each $R_f$ is independently a linear or branched $C_1$-$C_6$ perfluoroalkyl group; and a is 0 or an integer from 1 to 20. These perfluorinated alkoxy vinyl ethers and perfluorinated alkyl vinyl ethers are used with additional partially-fluorinated interpolymerized units in the fluoropolymer of the invention.

Specific examples of suitable perfluorinated monomers include hexafluoropropylene (HFP), 3-chloropentafluoropropene, and perfluorinated vinyl ethers such as $CF_2=CFOCF_3$, $CF_2=CFOCF_2CF_2OCF_3$, $CF_2=CFOCF_2CF_2CF_2OCF_3$, $CF_2=CFOCF_2CF_2CF_3$, $CF_2=CFOCF_2CF(CF_3)OCF_2CF_2CF_3$, and $CF_2=CFOCF_2CF(CF_3)OCF_2CF(CF_3)OCF_2CF_2CF_3$.

In another aspect of the invention, the partially-fluorinated polymer in the first and/or second layer comprises a polymer having interpolymerized units derived from tetrafluoroethylene and a nonfluorinated olefin, e.g., ethylene and/or propylene, and optionally hexafluoropropylene, and optionally a perfluoro vinyl ether, such as a perfluoro alkyl vinyl ether (PAVE) or a perfluoro alkoxy vinyl ether (PAOVE). In another aspect of the invention, the partially-fluorinated polymer in the first and/or second layer comprises a polymer having interpolymerized units derived from tetrafluoroethylene, hexafluoropropylene, and ethylene, and optionally a PAOVE or a PAVE. In another aspect of the invention, the partially-fluorinated polymer in the first and/or second layer comprises a polymer having interpolymerized units derived from tetrafluoroethylene, hexafluoropropylene, and vinylidene fluoride, and optionally a perfluoro alkyl or alkoxy vinyl ether. In another aspect of the invention, the partially-fluorinated polymer in the first and/or second layer comprises a polymer having interpolymerized units consisting essentially of tetrafluoroethylene, hexafluoropropylene, vinylidene fluoride, and optionally a perfluoro vinyl ether.

In another aspect of the invention, the partially-fluorinated polymer in the first and/or second layer comprises a polymer having less than about 30 weight percent (wt %) VDF, preferably between about 10 and about 25 wt %, of its interpolymerized units derived from VDF, and wherein the partially-fluorinated polymer in the second layer comprises a polymer having up to 100 weight percent of its interpolymerized units derived from VDF, such as a PVDF homopolymer or a VDF-containing polymer having between about 25 and 60 wt % of its interpolymerized units derived from vinylidene fluoride. Polymers of this category include those having interpolymerized units of $C_1$-$C_5$ non-fluorinated olefins along with fluorinated and/or perfluorinated interpolymerized units such as those described above, and polymers such as ETFE, HTE, TFE/P, and combinations thereof.

Various multilayer articles of the invention include a third, and/or fourth layer, which additional layer(s) comprises a polymer selected from partially-fluorinated polymers such as those described above, non-fluorinated polymers, and combinations thereof. Such third and fourth layers may be bonded to each other, or bonded on opposite sides of a core two-layer article of the invention. In some embodiments, five or even more layers are useful.

Non-fluorinated polymers include polyamides, polyimides, polyurethanes, polyolefins, polystyrenes, polyesters, polycarbonates, polyketones, polyureas, polyacrylates, polymethacrylates, acrylonitrile butadiene, butadiene rubber, chlorinated and chloro-sulfonated polyethylene, chloroprene, EPM, EPDM, PE-EPDM, PP-EPDM, EVOH, epichlorihydrin, isobutylene isoprene, isoprene, polysulfides, silicones, NBR/PVC, styrene butadienes, and vinyl acetate ethylenes, and combinations thereof. Tie layers, adhesives, surface treatments, dehydrofluorinating agents, and the like known in the art to improve adhesion can be used to aid in bonding such non-fluorinated polymers to a layered article of the invention.

Reinforcing materials also may be used in the invention. Such a material optionally may be used as a separate layer or included within a layer in a multi-layer embodiment of the present invention. These include, e.g., wire or fiberglass braiding.

A layer in a multilayer article of the invention may include known adjuvants such as antioxidants, conductive materials, carbon black, graphite, fillers, lubricants, pigments, plasticizers, processing aids, stabilizers, and the like including combinations of such materials. In some embodiments involving a bonding interface consisting essentially of the composition of the first and second layers of an article of the invention, these adjuvants do not materially improve the bonding properties between these two layers.

The article of the invention may also include a bonding interface between said first layer and said second layer. This bonding interface consists essentially of a first material having the composition of said first layer and a second material having the composition of said second layer. That is, this embodiment excludes etching, corona discharge, adhesion promoters, or other surface treatments that add one or more chemical species or remove one or more fluorine or other atoms or otherwise modifies the composition of either layer. Similarly, the first and second layers of the article of this embodiment of the invention do not include various other elements known to improve adhesion between a fluoropolymer and another material, such as a tie layer and/or adhesive, or reactive groups appended to the material of one or both layers.

The article of the invention has an interlayer adhesion between the first layer and the second layer of at least about one Newton per centimeter (N/cm), preferably at least about 2 N/cm, and more preferably at least about 5 N/cm. In some embodiments of the present invention, the interlayer adhesion above about 15 N/cm, or even above about 30 or 40 N/cm. This interlayer adhesion level is measured by the peel test of ASTM D 1876 described below.

In another aspect the invention provides a fuel hose comprising a multilayer article as described above. In addition, an outer layer may be bonded to either of the first or second layers. Also, an intermediate layer comprising a partially-fluorinated polymer can be bonded to the second layer, and optionally this intermediate layer can be bonded to the intermediate layer. The inner layer can comprise a partially-fluorinated elastomer.

One process for preparing a multi-layer article featuring a layered fluoropolymer of the present invention involves providing a first layer comprising a fluoropolymer as described above, providing a second layer bonded to the first layer, the second layer comprising a fluoropolymer as described above, and heating at least one layer and the interface between the layers to a temperature above the softening point or melting point of at least one of the layers. Generally, the highest melting or softening point of all components used in a blend of the invention defines the preferred minimum temperature for preparing the multi-layer article. For example, when a fluorothermoplastic is used in a layer, this layer is preferably heated to the melting point of the perfluorothermoplastic or above, and when a fluoroelastomer is used in a layer, this layer is preferably heated to the softening point or the melt processing range of the fluoroelastomer or above. In addition, the layers are preferably pressed together, such as through a nip or platen or other known means. Generally, increasing the time, temperature, and/or pressure can improve interlayer adhesion. The conditions for bonding any two layers can be optimized through routine experimentation.

Another process for preparing a multi-layer article featuring a fluoropolymer layer of the present invention involves coextruding two or more layers through a die to form an article. Such coextrusion processes are useful, e.g., for preparing sheets, tubing, containers, etc.

Still another process for preparing a multi-layer article featuring a fluoropolymer layer of the present invention involves extruding one layer through a die to form a length of tubing. A second extruder supplies a crosshead die to coat another layer of molten fluoropolymer onto a surface of the tubing. Additional layers can be added through similar means. Following the extrusion operations, the multi-layer article may be cooled, e.g., by immersion in a cooling bath. This process can be used to form multilayer sheets of the invention, as well as other shapes, by using extrusion die shapes known in the art.

Preferably one layer of the article of the invention has a different VF or VDF level than the other layer of the inventive article, or vice-versa. In some embodiments, the difference in such monomer levels is at least about 5 wt %, preferably at least about 10 wt %, 20 wt %, or even greater. When a fluoropolymer has a low (or no) VF or VDF level, the balance of the polymer is preferably comprised of TFE and non-fluorinated olefins. In such a case, the fluoropolymer of the other layer has at least about 5 to 20 wt %.

Multi-layer articles prepared according to the invention can be provided in a wide variety of shapes, including sheets, films, containers, hoses, tubes, and the like. The articles are especially useful wherever chemical resistance and/or barrier properties are desired. Examples of specific uses for the articles include their use in reflective materials, paint replacement films, drag reduction films, fuel line and filler neck hoses, fuel tanks, exhaust hoses, and the like. The articles are also useful in chemical handling and processing applications, and as wire and cable coatings.

Objects and advantages of this invention are further illustrated by the following examples, but the particular materials and amounts thereof recited in these examples, as well as other conditions and details, should not be construed to unduly limit this invention.

EXAMPLES

Materials

A, a copolymer of 42.0 TFE, 20.0 HFP, and 38.0 VDF (wt %), Tm 125° C.

B, a copolymer of 60.0 TFE, 18.0 HFP, and 22.0 VDF (wt %), Tm 165° C.

C, a copolymer of TFE, HFP, and Ethylene, available as Dyneon™ HTE-1500 from Dyneon LLC, Oakdale Minn.

D, a copolymer of 91.0 wt % TFE and 9.0 Propylene

E, a copolymer of a copolymer of 73.0 TFE, 11.5 HFP, 11.5 VDF, and 4.0 PPVE (wt %), Tm 222° C., MFI 4.8

F, Solef™ PVDF 1010, a homopolymer of VDF, available from Solvay, Paris, France

G, a copolymer of TFE and Ethylene, available as ETFE-EP610 from Daikin

H, a copolymer of 59.9 TFE, 21.5 HFP, and 18.6 VDF (wt %), Tm 185° C.

Test Methods

Thermal Lamination:

To facilitate testing of the adhesion between the layers via a T-peel test, a sheet of 0.05 mm thick polyimide film (available as Apical from Kaneka High-Tech Materials, Inc., Pasadena Tex.) was inserted about 0.25 in. (6.4 mm) along one short edge between the two films described below before hot pressing. In earlier samples a PTFE-coated fiber sheet was used, but it adhered to the inventive films. In some cases, a slight force was necessary to keep good surface contact between the films. The polyimide sheet peeled away from each material and was used only to create tabs of the resulting laminate, which tabs later were inserted into the jaws of a test device.

The two-layer sheet was heated under pressure at 250-300° C. for 2-3 minutes between the platens of a Wabash Hydraulic press to bond the layers using a pressure of about 30 kPa, then immediately transferred to a cold press. After cooling to room temperature by a "cold pressing", the resulting sample was subjected to T-peel measurement. The results appear in Table 1.

Peel Adhesion

Peel strength between the layers was measured in accordance with ASTM D 1876 (T-Peel Test). To facilitate testing of the adhesion between the layers via a T-peel test, a sheet of 0.05 mm thick polyimide film (available as Apical from Kaneka High-Tech Materials, Inc., Pasadena Tex.) was inserted about 2.54 cm between the films along one edge of the laminate sample before pressing. The polyimide sheet peeled away from each material and was used only to create tabs of the resulting laminate, which were inserted into the jaws of a test device. Samples were cut into strips 25.4 mm wide by about 2 to 2.5 in. (5 to 6.3 cm) in length.

A Model 1125 tester (available from Instron Corp., Canton Mass.) at 4 in./min/(100 mm/min.) crosshead speed equipped with a Sintech Tester 20 (available from MTS Systems Corporation, Eden Prairie, Minn.) was used as the test device. The peel strength values reported in the tables below were averages of at least two samples.

Examples

Polymers films of the materials shown in Table 1 were laminated as described in the Thermal Lamination section above using press conditions of time and temperature as shown in Table 1. Samples were cut and tested as described above for Peel Adhesion.

TABLE 1

Bonding Results

| Example | Temp. (C.) | Time (min.) | Layer 1 | Layer 2 | Peel (lb/in) | Peel (N/cm) |
|---|---|---|---|---|---|---|
| 1 | 300 | 2 | G | B | 8.0 | 14.1 |
| 2 | 300 | 2 | G | A | 13.0 | 22.9 |
| 3 | 300 | 2 | G | E | 0.7 | 1.2 |
| 4 | 300 | 2 | G | F | 0.2 | 0.4 |
| 5 | 300 | 2 | G | C | >25 | >44.0 |
| 6 | 250 | 3 | G | C | >20 | >35.2 |
| 7 | 250 | 3 | G | B | 2.5 | 4.4 |
| 8 | 250 | 3 | G | A | 3.0 | 5.3 |
| 9 | 300 | 2 | E | H | 10.0 | 17.6 |
| 10 | 300 | 2 | E | B | 12.0 | 21.1 |
| 11 | 300 | 2 | E | A | 15.0 | 26.4 |
| 12 | 250 | 2 | E | H | 2.0 | 3.5 |
| 13 | 250 | 2 | E | A | 1.5 | 2.6 |
| 14 | 250 | 2 | H | B | 16.0 | 28.2 |
| 15 | 250 | 2 | H | A | 15.0 | 26.4 |
| 16 | 250 | 2 | B | A | 24.0 | 42.2 |
| 17 | 250 | 3 | C | E | 1.2 | 2.1 |
| 18 | 250 | 3 | C | B | 25.0 | 44.0 |
| 19 | 250 | 3 | C | A | >25 | >44.0 |
| 20 | 250 | 3 | C | F | 0.2 | 0.4 |
| 21 | 300 | 3 | C | E | 1.2 | 2.1 |
| 22 | 300 | 2 | C | B | 25.0 | 44.0 |
| 23 | 300 | 2 | C | A | 18.0 | 31.7 |
| 24 | 177 | 3 | D | B | 8.8 | 15.5 |

Various modifications and alterations of this invention will become apparent to those skilled in the art without departing from the scope and principles of this invention, and it should be understood that this invention is not to be unduly limited to the illustrative embodiments set forth hereinabove. All publications and patents are herein incorporated by reference to the same extent as if each individual publication or patent was specifically and individually indicated to be incorporated by reference.

We claim:

1. An article comprising:
   a first layer comprising a first substantially solid partially-fluorinated thermoplastic polymer having at least 10 wt % vinylidene fluoride; and
   a second layer comprising a second substantially solid partially-fluorinated thermoplastic polymer having at least 10 wt % vinylidene fluoride, the second layer bonded to the first layer;
   wherein the first substantially solid partially-fluorinated thermoplastic and the second substantially solid partially-fluorinated thermoplastic have different compositions
   with the proviso wherein the bonding interface between the first layer and second layer is free of a reactive group appended to the material of one or both layers.

2. The article of claim 1, further comprising a bonding interface between said first layer and said second layer consisting essentially of a first material having the composition of said first layer and a second material having the composition of said second layer.

3. The article of claim 1, wherein the first and second layers have an interlayer adhesion level of at least about one Newton per centimeter (N/cm).

4. The article of claim 1, wherein the partially-fluorinated thermoplastic in the first and/or second layer comprises a homopolymer.

5. The article of claim 1, wherein the partially-fluorinated thermoplastic in the first and/or second layer comprises a copolymer having at least two different interpolymerized monomers.

6. The article of claim 1, wherein the partially-fluorinated thermoplastic in the first and/or second layer further comprises a polymer having interpolymerized units derived from tetrafluoroethylene, hexafluoropropylene, vinylidene fluoride, vinyl fluoride, a perfluorinated alkoxy vinyl ether, a perfluorinated alkyl vinyl ether, and combinations thereof.

7. The article of claim 1, wherein the partially-fluorinated thermoplastic in the first and/or second layer further comprises a polymer having interpolymerized units derived from a hydrogen-containing monomer having a methylene hydrogen having a pH at or below the pH of vinylidene fluoride.

8. The article of claim 1, wherein the partially-fluorinated thermoplastic in the first and/or second layer further comprises a polymer having interpolymerized units derived from tetrafluoroethylene and a nonfluorinated olefin, and optionally hexafluoropropylene, and optionally a perfluoro vinyl ether.

9. The article of claim 1, wherein the partially-fluorinated thermoplastic in the first and/or second layer further comprises a polymer having interpolymerized units derived from tetrafluoroethylene, hexafluoropropylene, and ethylene, and optionally a perfluoro vinyl ether.

10. The article of claim 1, wherein the partially-fluorinated thermoplastic in the first and/or second layer further comprises a polymer having interpolymerized units derived from tetrafluoroethylene, hexafluoropropylene, and vinylidene fluoride, and optionally a perfluoro alkyl vinyl ether or a perfluoro alkoxy vinyl ether.

11. The article of claim 1, wherein the partially-fluorinated thermoplastic in the first and/or second layer further comprises a polymer having interpolymerized units consisting essentially of tetrafluoroethylene, hexafluoropropylene, vinylidene fluoride, and optionally a perfluoro vinyl ether.

12. The article of claim 1, wherein the partially-fluorinated thermoplastic in the first layer comprises a polymer having less than about 30 weight percent of its interpolymerized units derived from vinylidene fluoride, and wherein the partially-fluorinated thermoplastic in the second layer comprises a polymer having up to 100 weight percent of its interpolymerized units derived from vinylidene fluoride.

13. The article of claim 1, wherein a partially-fluorinated polymer in the first and/or second layer comprises interpolymerized units of Formula I:

—CF(X)—CX$_2$—,  (I)

wherein each X is independently hydrogen, a halogen atom, or a C$_1$-C$_8$ alkyl group which may be fluorinated.

14. The article of claim 13, wherein the partially-fluorinated thermoplastic in the first and/or second layer comprises at least 70 weight percent (wt %) of its interpolymerized units of Formula I.

15. The article of claim 13, wherein the partially-fluorinated thermoplastic in the first and/or second layer comprises at least 80 wt % of its interpolymerized units of Formula I.

16. The article of claim 1, further comprising a third layer comprising a polymer, bonded to the first or second layer.

17. The article of claim 16, wherein the third layer comprises a polymer selected from partially-fluorinated polymers, non-fluorinated polymers, and combinations thereof.

18. The article of claim 17, further comprising a fourth layer comprising a polymer, the fourth layer bonded either to the first layer on a surface opposite the second layer or to the third layer.

19. The article of claim 18, wherein the fourth layer comprises a polymer selected from partially-fluorinated polymers, non-fluorinated polymers, and combinations thereof.

20. An article comprising:
a first layer comprising a first substantially solid partially-fluorinated thermoplastic polymer having at least 10 wt % vinylidene fluoride; and
a second layer comprising a second substantially solid partially-fluorinated thermoplastic polymer having at least 10 wt % vinylidene fluoride, the second layer bonded to the first layer;
wherein the first substantially solid partially-fluorinated thermoplastic and the second substantially solid partially-fluorinated thermoplastic have different compositions
wherein the partially-fluorinated thermoplastic in the first and/or second layer comprises a fluorinated polymer comprising interpolymerized units of Formula II:

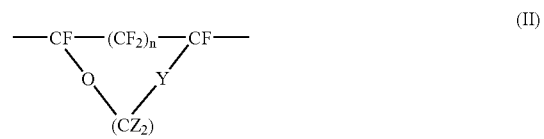

wherein each Y is independently a bond, oxygen or CF$_2$; each Z is independently F or R$_f$ wherein each R$_f$ is independently a C$_1$-C$_{10}$ fluoroalkyl group; and n is 0-3, with the proviso wherein the bonding interface between the first layer and second layer is free of a reactive group appended to the material of one or both layers.

21. A fuel hose comprising an article comprising:
a first layer comprising a first substantially solid partially-fluorinated thermoplastic polymer having at least 10 wt % vinylidene fluoride; and
a second layer comprising a second substantially solid partially-fluorinated thermoplastic polymer having at least 10 wt % vinylidene fluoride, the second layer bonded to the first layer;
wherein the first substantially solid partially-fluorinated thermoplastic and the second substantially solid partially-fluorinated thermoplastic have different compositions
with the proviso wherein the bonding interface between the first layer and second layer is free of a reactive group appended to the material of one or both layers.

22. The fuel hose of claim 21 further comprising an outer layer optionally comprising a non-fluorinated polymer.

23. The fuel hose of claim 22, wherein the first layer is bonded to the outer layer and further comprising:
a) an intermediate layer comprising a partially-fluorinated polymer bonded to the second layer; and optionally
b) an inner layer bonded to the intermediate layer, the inner layer optionally comprising a partially-fluorinated elastomer and optionally comprising a conductive material.

24. The fuel hose of claim 22, wherein the outer layer comprises a material selected from polyamides, polyimides, polyurethanes, polyolefins, polystyrenes, polyesters, polycarbonates, polyketones, polyureas, polyacrylates, polymethacrylates, acrylonitrile butadiene, butadiene rubber, chlorinated and chloro-sulfonated polyethylene, chloroprene, EPM, EPDM, PE-EPDM, PP-EPDM, EVOH, epichlorihydrin, isobutylene isoprene, isoprene, polysulfides, silicones, NBR/PVC, styrene butadienes, and vinyl acetate ethylenes, and combinations thereof.

25. The fuel hose of claim 22, further comprising a reinforcing material, optionally as a separate layer or included within a layer.

* * * * *

UNITED STATES PATENT AND TRADEMARK OFFICE
CERTIFICATE OF CORRECTION

PATENT NO. : 7,569,275 B2  Page 1 of 1
APPLICATION NO. : 10/126126
DATED : August 4, 2009
INVENTOR(S) : Todd Fukushi It is certified that error appears in the above-identified patent and that said Letters Patent is hereby corrected as shown below:

Title Page, Column 2 (Other Publications)
Line 12, delete "Poly(tetrafluoreoethylene)" and insert in place thereof -- Poly(tetrafluoroethylene) --.

Line 14, delete "Fluoropolymer," and insert in place thereof -- Fluoropolymers, --.

Column 2
Line 44 (approx.), delete "layer" and insert in place thereof -- layer, --.

Column 4
Lines 52-53, delete "epichlorihydrin," and insert in place thereof -- epichlorohydrin --.

Column 10
Lines 45-46 (approx.), in Claim 24, delete "epichlorihydrin," and insert in place thereof -- epichlorohydrin --.

Signed and Sealed this

Twenty-seventh Day of April, 2010

David J. Kappos
*Director of the United States Patent and Trademark Office*